United States Patent
Everett et al.

(10) Patent No.: US 7,207,586 B2
(45) Date of Patent: Apr. 24, 2007

(54) TRAILER HITCH ASSEMBLY FOR A BICYCLE

(76) Inventors: Richard C. Everett, 225 Sunshine La., West Lynn, OR (US) 97068; Oscar E. Smith, 1892 W. Lotus Pl., Brea, CA (US) 92821

( * ) Notice: Subject to any disclaimer, the term of this patent is extended or adjusted under 35 U.S.C. 154(b) by 278 days.

(21) Appl. No.: 10/918,861

(22) Filed: Aug. 16, 2004

(65) Prior Publication Data
US 2006/0032681 A1    Feb. 16, 2006

(51) Int. Cl.
*B62K 27/12*    (2006.01)
(52) U.S. Cl. .................... 280/292; 280/204; 280/288.4
(58) Field of Classification Search .............. 280/202, 280/204, 288.4, 292, 495
See application file for complete search history.

(56) References Cited

U.S. PATENT DOCUMENTS

| | | | | |
|---|---|---|---|---|
| 4,721,320 A | * | 1/1988 | Creps et al. ................ | 280/204 |
| 5,242,178 A | * | 9/1993 | Galasso et al. ............. | 280/204 |
| 5,860,662 A | * | 1/1999 | Bartoshesky et al. ....... | 280/204 |
| 6,050,581 A | * | 4/2000 | Everett ....................... | 280/204 |
| 6,099,008 A | * | 8/2000 | Caffey ........................ | 280/204 |
| 6,099,011 A | * | 8/2000 | Beaudoin et al. ........... | 280/292 |
| 6,305,703 B1 | * | 10/2001 | Quick et al. ................ | 280/204 |
| 6,663,126 B2 | * | 12/2003 | Britton et al. .............. | 280/204 |

* cited by examiner

*Primary Examiner*—Lesley D. Morris
*Assistant Examiner*—Marc A. Scharich
(74) *Attorney, Agent, or Firm*—Edward E. Roberts

(57) ABSTRACT

A bicycle trailer hitch assembly including first and second complementary hitch bracket members adapted and arranged for attachment to opposites sides of the bicycle frame rear wheel drop out. Each bracket member includes a main body portion con figured on one side for abutting relation with the bicycle rear wheel drop out and on the other side for receiving the trailer tongue tube to provide center pulling of the trailer. The bicycle quick release skewer which holds the rear wheel clamped to the drop out member likewise secures both brackets to the drop out member. Each of the brackets has a fastener arrangement for enabling securing the bracket to the trailer drawbar.

9 Claims, 4 Drawing Sheets

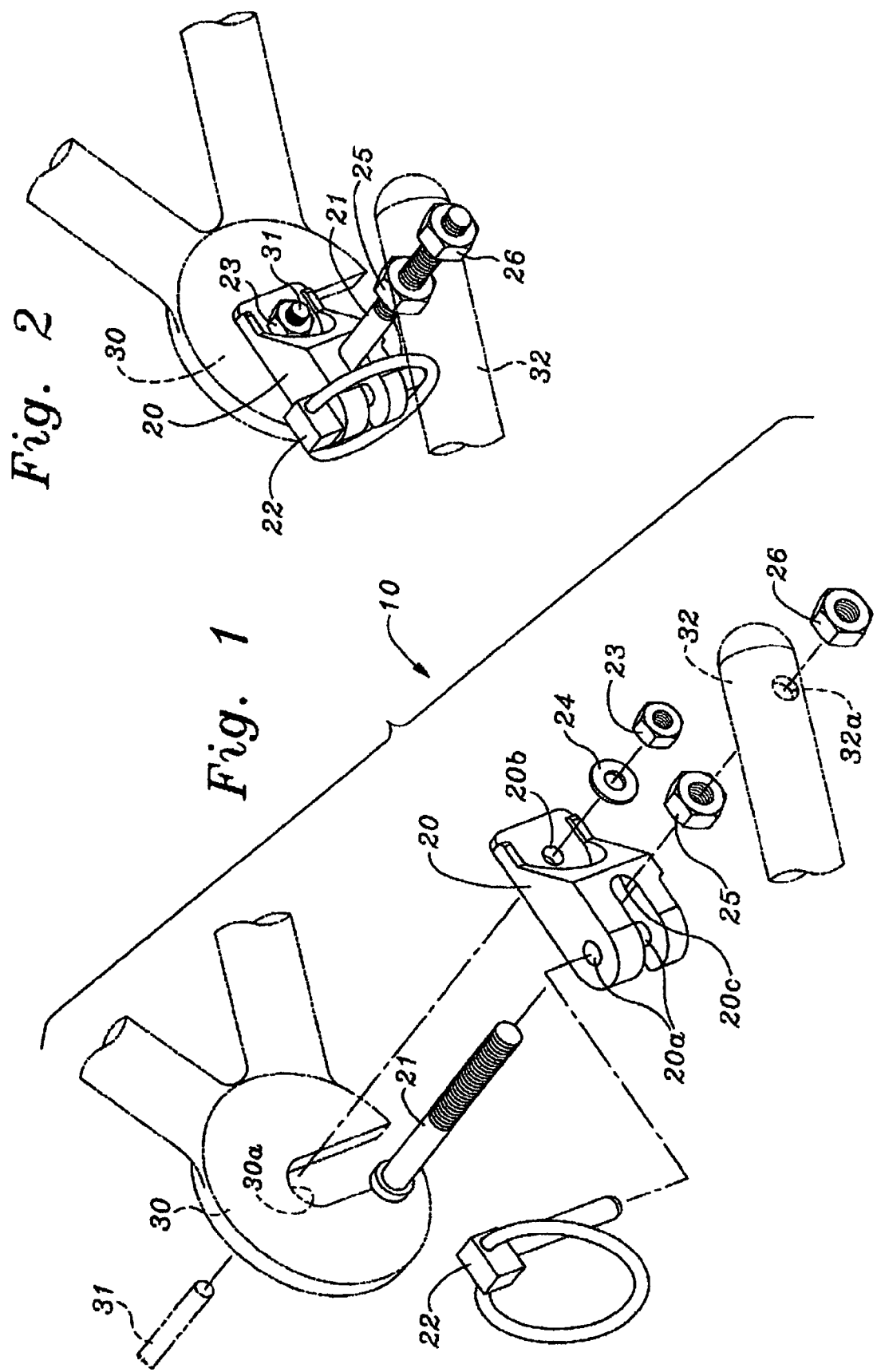

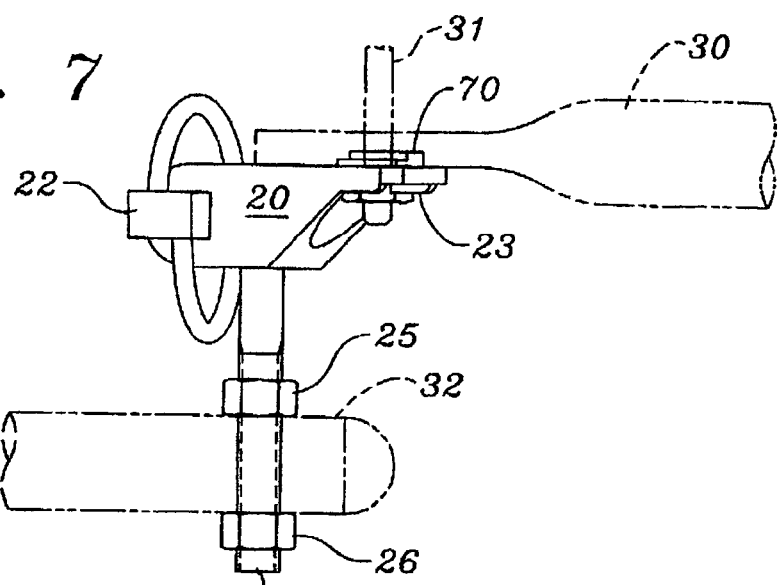
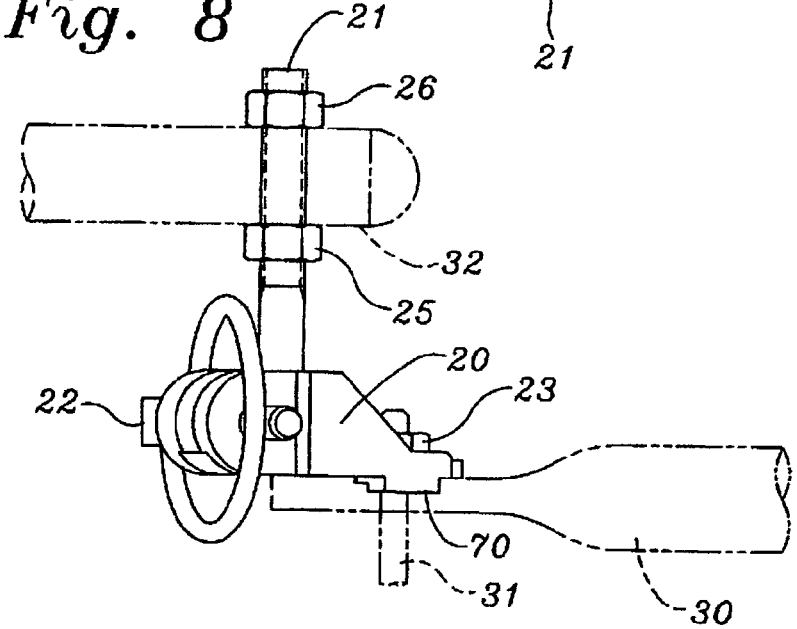
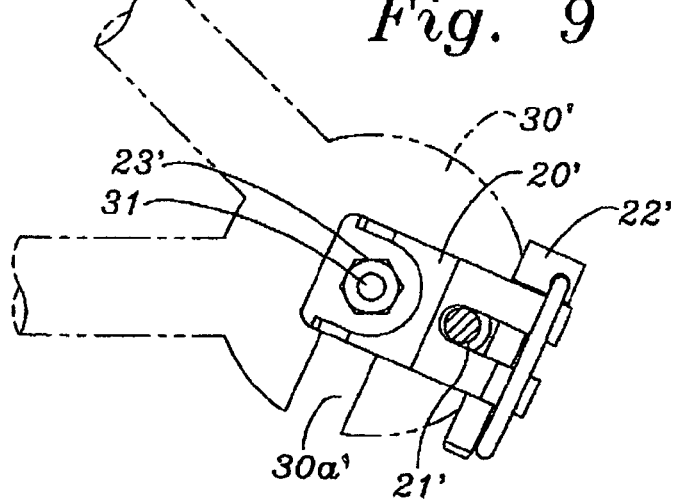

TRAILER HITCH ASSEMBLY FOR A BICYCLE

CLAIM FOR BENEFIT OF EARLIER FILING DATE

The present utility application claims the benefit of U.S. Provisional Application No. 60/494,460 filed on 13 Aug. 2003 and entitled "Trailer Hitch Assembly for a Bicycle". The present utility application has the same inventor, subject matter and title as the aforesaid Provisional Application.

BACKGROUND

The background of the invention will be discussed in two parts.

FIELD OF THE INVENTION

This invention relates to accessories for bicycles, and more particularly to a trailer hitch assembly for use with a bicycle trailer for center pull towing of the trailer.

DESCRIPTION OF THE RELATED ART

Bicycling has become a standard method of physical exercise, as well as a method of transportation. As part of the use of bicycles for families, there has been a trend toward the use of trailers for bicycles, the trailers having such uses as transportation of small children and transportation of cargo. Trailer hitches have been designed for bicycles for towing such trailers. Many of such trailer hitches are configured for attachment to the frame of the bicycle at one side of the bicycle adjacent the axle of the rear wheel.

A typical problem associated with bicycle trailer towing involves the variety in bicycle frames. They are not configured alike and they are usually of a different size. Widths at the rear wheel, along with the angle (crotch angle) formed adjacent the rear wheel between the seat stay and the chain stay, may vary. Further, tube dimensions and cross-sectional shapes for the chain and seat stays may vary from one manufacturer to another. Bicycle hitches are normally attached at or adjacent the crotch angle, and thus, due to these variances in widths and angles, a given hitch may fit only a limited number of bicycle frames.

One type of trailer hitch is shown and described in U.S. Pat. No. 4,721,320, entitled "Bicycle Trailer Hitch", issued to Creps et al. on 26 Jan. 1988. The Creps trailer hitch is configured for attachment to one side of the bicycle frame at the crotch portion of the rear part of the frame, that is, at the junction of the seat stay and chain stay members of the frame. As shown in the drawings of the Creps patent, the trailer hitch is attached on the left side of the bicycle frame, and as a consequence right hand turns of the bicycle are impeded with the bicycle trailer attached. Likewise, if the trailer hitch of Creps is designed to be in like fashion attached on the right side of a bicycle frame, left hand turns of the bicycle would be impeded with the trailer so attached.

Another type of trailer hitch is shown and described in U.S. Pat. No. 6,050,581 entitled "Bicycle Trailer Hitch Assembly", issued to Everett on 18 Apr. 2000. This hitch includes two hitch members configured as mirror images of one another, the hitch members being adapted for attachment to opposing sides of the rear of a bicycle frame. The hitch has the disadvantage of being unduly complex and not sufficiently suitable for a variety of bicycle frame configurations.

Such hitches as disclosed in Creps and Everett are illustrative of the varied designs whereby attempts have been made to improve and simplify bicycle hitches for pulling trailers. It is thus an aspect of the present invention to provide a new and improved bicycle hitch for pulling a bicycle trailer that is simple, provides needed performance and safety, and is designed for enabling center pulling of a towed trailer. It is another aspect of the invention to provide a bicycle hitch for center pulling of a bicycle trailer that is attached at the bicycle wheel drop out channels and designed to work with a variety of bicycle frame configurations.

SUMMARY

In accordance with the present invention there is provided a bicycle trailer hitch assembly including first and second hitch members adapted and arranged for attachment to opposite sides of the bicycle frame at the respective rear wheel drop out channels. The hitch members are complementary to each other but are not necessarily mirror images of one another. Each hitch member includes a main body portion configured on one side for abutting relation with the bicycle frame at the rear wheel drop out channel, and on the other side configured for securely connecting to a trailer tongue. The trailer tongue is configured with a generally U-shaped upper portion for respective bracket connection thereby to provide for center pulling of the bicycle trailer.

DRAWINGS

FIG. 1 is an exploded view of the right side bracket of the bicycle trailer hitch assembly embodying features of the present invention.

FIG. 2 is a perspective view of the right side bracket of FIG. 1 showing the bracket assembled at the right side drop out channel of a bicycle frame;

FIG. 7 is a top plan view of the bicycle trailer hitch assembly of FIG. 2;

FIG. 8 is a bottom plan view of the bicycle trailer hitch assembly of FIG. 2; and FIG. 9 is a plan view of the of the opposing complementary bracket assembly as mounted on the opposite side of the bicycle frame drop out channel from the bracket shown in FIG. 2.

DESCRIPTION

Figure 3:
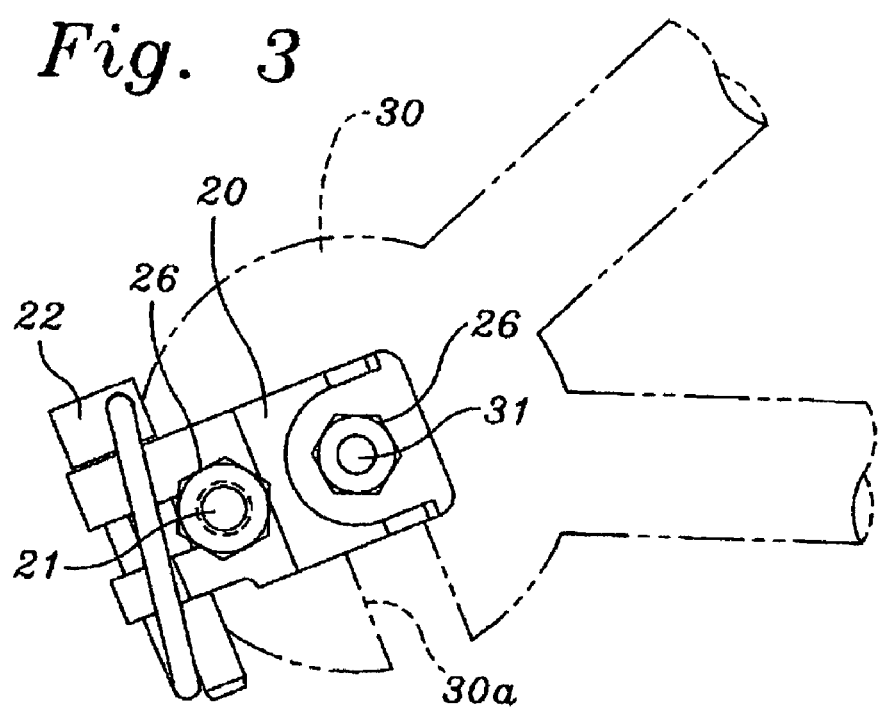
FIG. 3 is plan view of the assembled right side bracket illustrated in FIG. 2.

Referring to the drawings there is shown a bicycle trailer hitch assembly embodying features of the invention for attachment to the frame of a bicycle at the rear wheel drop out channels of the frame. Neither the bicycle frame nor the bicycle trailer is shown in detail, there being depicted in broken lines only those structural members necessary to an understanding of the invention. The trailer hitch assembly of the invention includes a first, or right side, hitch member attached to the bicycle frame at the right side of the rear wheel drop out channel area and a second, or left side, complementary configured and dimensioned hitch member attached to the bicycle frame at the opposing or left side drop out channel. As attached in such opposing manner, the first and second hitch members, in conjunction with a respective two-arm trailer tongue (one part of which is shown in FIG. 1 with the reference numeral 32), the trailer can then be towed in what is referred to as a "center pull" manner.

FIG. 1 shows the first, or right side of hitch assembly, generally, designated 10, in exploded view and then shown assembled in FIG. 2. FIGS. 3–8 show various other views of the assembly as shown in FIG. 2. As will be further discussed, FIG. 9 is a plan view of the opposing hitch bracket of the trailer hitch assembly mounted on the opposite side of the bicycle frame from the bracket shown in FIG. 2. As illustrated in FIG. 1, shown in phantom is the bicycle rear wheel drop out member 30 having drop out channel or slot 30a, the bicycle rear wheel quick release skewer 31, and the bicycle trailer (not shown) tongue portion or drawbar 32. The bicycle rear wheel quick release skewer 31, which holds the rear wheel clamped to the drop out member 30, also provides the means to clamp hitch assembly 10 to the drop out member 30. Thus, the hitch assembly 10 is mounted to the bicycle frame in the drop out channel or slot 30a in the same manner as the bicycle rear wheel. Skewer 31 extends through drop out area, or slot, 30a and into the opposite complementary bracket (as shown in FIG. 9) on the opposite side of the bicycle frame to likewise secure it to its respective drop out member. The trailer tongue portion or drawbar 32 connects the bicycle trailer to the hitch assembly 10 and provides a horizontal pivot when turning. Respective drawbars connect the bicycle to the trailer from both sides of the bicycle frame to a single center point at the front of the trailer.

As best seen in FIGS. 1 and 2, hitch assembly 10 includes a main body receiver bracket 20, tongue bolt 21, safety lynch pin member 22, skewer nut 23, flat washer 24, inner tongue bolt nut 25, and outer tongue bolt nut 26. The bracket 20 on the inside thereof has a generally planar bearing surface for mounting against the right side rear wheel drop out member 30 and when so mounted is secured thereto by quick release skewer 31. On the other side of bracket 20 there is provided attachment and locking means for the trailer tongue portion 32. The tongue bolt 21 with threaded end fits into slot 20c of bracket 20 and through aperture 32a of tongue portion 32 and is locked in place by inner tongue bolt nut 25 and outer tongue bolt nut 26. Tongue bolt 21 provides the connection between the tongue 32 and the bracket 20 and is held in place by safety lynch pin member 22. Lynch pin member 22 includes a longitudinal pin for fitting through apertures 20a of bracket 20 to secure tongue bolt 21 in slot 20c of bracket 20. Lynch pin member 22 is configured with an enlarged head through which a pull ring is inserted, the enlarged head abutting bracket 20 to provide a stop when the longitudinal pin is inserted through apertures 20a and the pull ring providing means for removing the longitudinal pin from apertures 20a.

In configuration, bracket 20 has a generally planar inner bearing surface for mounting against the rear wheel drop out member 30 with the opposite or outer surface facing outward from the bicycle frame. As illustrated in FIG. 1, bracket 20 has a generally U-shaped rearward portion as defined by slot 20c, slot 20c having a rearward projecting ear on each side thereof, the ears having complementary apertures for receiving downwardly inserted lynch pin 22. As indicated in FIGS. 1–4 the lower ear of bracket 20 is shown of decreased width from that of the upper ear to provide clearance, if needed, for the bicycle gear changing mechanism. The bracket 20' of FIG. 9 need not, and isn't shown with, this decreased width. The generally U-shaped rearward portion includes a generally planar surface portion, opposite to and generally parallel with the inner bearing surface, and a forward portion configured with a recess having an aperture 20b for receiving skewer 31, washer 24 and skewer locking nut 23.

Rear wheel quick release skewer 31 is standard to the bicycle and extends through the drop out channel, or slot, 30a of drop out member 30 serving to clamp the rear wheel of the bicycle to drop out member 30. Used in conjunction with flat washer 24, skewer nut 23 replaces the standard end knob of skewer 31 to thereby utilize more of the threads of skewer 31 to provide a more suitable connection. Inner tongue bolt nut 25 threads onto tongue bolt 21 and then in conjunction with outer tongue bolt 26 is tightened against the tongue 32 to provide a secure assembly. For negotiation of uneven terrain, the hitch assembly 10 works in conjunction with anti-pivot peg 70, which is variously shown in the drawings. Anti-pivot peg 70 is mounted in drop out channel 30a to hold bracket 20 in position to prevent up or down rotation.

Figure 4:
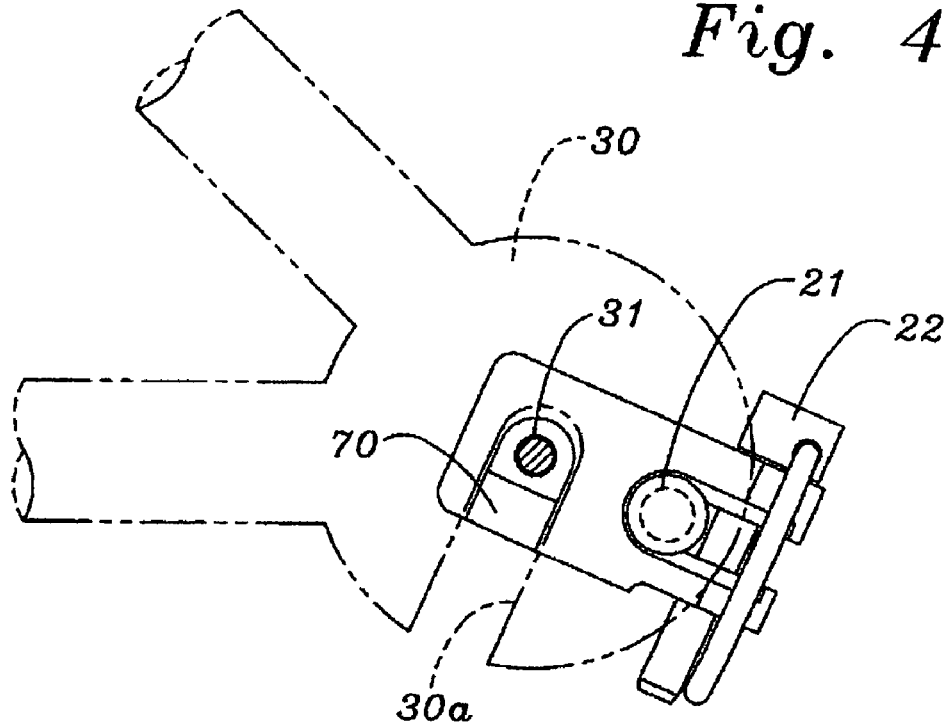
FIG. 4 is a plan view of the back side of the right side trailer hitch bracket as assembled in FIG. 3.

FIG. 3 is the right side view of the bracket 20 of the trailer hitch assembly 10 as shown in FIG. 2, with FIG. 4 showing the rear or opposite side of bracket 20 from that of FIG. 3. Skewer 31 is shown in cross-section indicating its extension into the complementary bracket 20' (FIG. 9) mounted on the left or opposite side of the bicycle frame.

Figure 5:
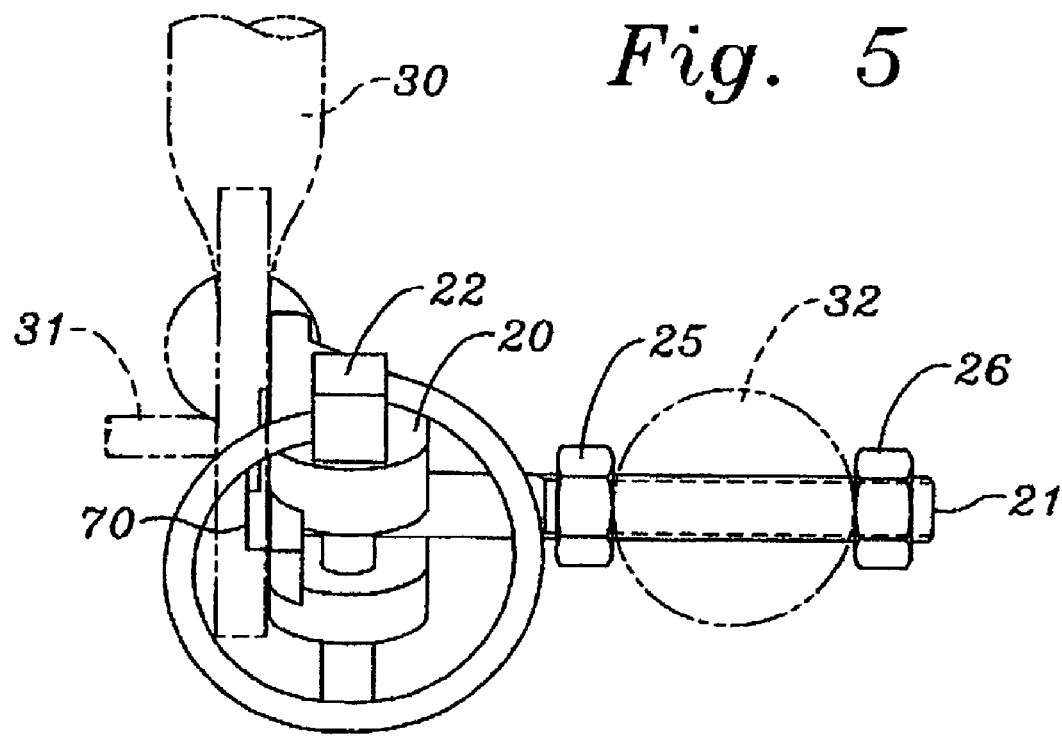
FIG. 5 is a plan view of the trailer hitch right side bracket of FIG. 2 as seen from the rear of the bicycle.
Figure 6:
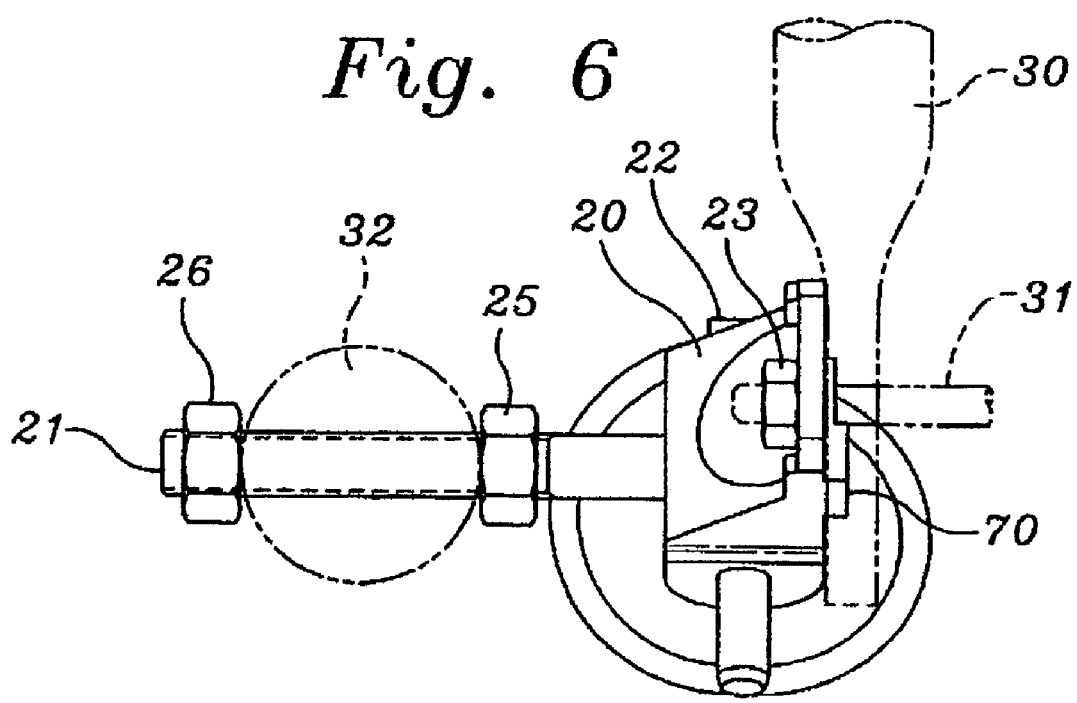
FIG. 6 is a plan view of the trailer hitch right side bracket assembly of FIG. 2 as seen from the front of the bicycle, this view of the assembly being opposite the view of the trailer hitch assembly as shown in FIG. 5.

FIG. 5 is a view of the trailer hitch assembly bracket 20 of FIG. 2 as seen from the rear of the bicycle. Shown in phantom is drop out member 30, trailer tongue drawbar 32 and skewer 31. FIG. 6 is a view of the trailer hitch assembly of FIG. 5 turned 180 degrees, that is, a view as seen looking toward the rear of the bicycle.

FIG. 7 is a top plan view of the bicycle trailer hitch assembly of FIG. 2 and FIG. 8 is a bottom plan view of the trailer hitch assembled bracket of FIG. 2.

FIG. 9 is a plan view of the opposing hitch bracket, designated 20', of the trailer hitch assembly located on the opposite side of the bicycle frame from the bracket 20 shown in FIG. 2. In this FIG. 9 part numerals are shown with a prime (') to indicate the complementary bracket 20', otherwise, except for bracket 20' they are the same as part numerals shown in FIG. 2 without a prime ('). Hitch bracket 20' may be the mirror image of bracket 20 or may be modified as discussed above in accordance with the invention. In any event, each hitch bracket includes a main body portion having a generally planar bearing surface configured on one side for abutting relation with its respective drop out member, and on the other or opposite side configured for securely receiving its respective trailer tongue member thereby to provide for center pulling of the bicycle trailer.

In accordance with the invention, there has been shown and described a new and improved bicycle hitch of compact and efficient construction with provision for pulling a trailer that is simple, provides needed performance and safety, and is designed for enabling center pulling of a towed trailer. While the description has utilized directional references, such as inner, outer, up, upper, under, down, right, left, clockwise, etc., it is to be understood that these terms are utilized with reference to the orientations in the Figures and are not intended to be limiting. While there has been shown and described a trailer hitch for a bicycle embodying features of the invention, other adaptations and modifications may be made without departing from the spirit and scope of the invention.

What is claimed is:

1. A bicycle trailer hitch assembly for attachment to opposites sides of a bicycle rear wheel drop out member, said assembly comprising: first and second similarly configured hitch members, each including a main body portion having a first surface configured for mounting against a respective side of said rear wheel drop out member and a second surface opposite to said first surface including a first portion configured for coacting with means for connection to a trailer tongue, and a second portion configured for receiving a bicycle skewer therethrough, said skewer coacting with fastening means for securing said main body portion against said drop out member; said first portion being generally U-shaped as defined by a generally horizontal open slot extending from a left end of said first portion and through said main body portion; each said means for connection to a trailer tongue includes a tongue bolt restrained by said main body portion with means for fastening said tongue bolt to a respective arm of said trailer tongue; fastening means for securing said main body portion against said drop out member including aperture means for accepting said skewer therethrough and means for tightening said main body portion to said skewer to thereby secure said main body portion to said drop out member; and said main body portion is unitary, said first surface is generally planar, said second portion is recessed into said main body portion, and said aperture means includes anti-pivot means for preventing rotation of said main body portion.

2. A bicycle trailer hitch assembly for attachment to a frame of a bicycle at a rear wheel drop out member, said hitch assembly comprising: a main body member having a first surface configured for mounting to a first side of the bicycle rear wheel drop out member; said main body member having a second surface opposite said first surface, said second surface having a first portion configured to include fastening means for securing a trailer tongue to said main body member and a second portion configured to include securing means coacting with a bicycle rear wheel skewer to secure said main body member to said drop out member; said first portion being generally U-shaped as defined by a generally horizontal open slot extending from a left end of said first portion and through said main body member; said fastening means includes a tongue bolt restrained by said main body member with means for fastening said tongue bolt to a bicycle trailer hitch; said second portion includes aperture means for accepting said skewer therethrough and means for tightening said main body member to said skewer to thereby secure said main body member to said drop out member; and said second portion is recessed into said main body member and said aperture means includes anti-pivot means for preventing rotation of said main body member.

3. The bicycle trailer hitch assembly of claim 2 wherein said main body member is unitary and said first surface is generally planar.

4. The bicycle trailer hitch assembly of claim 2 further comprising a second main body member similarly configured as said main body member for attachment to an opposite side of said drop out member for coacting with a second portion of said bicycle trailer hitch.

5. A bicycle trailer hitch assembly for attachment to a frame of a bicycle at a rear wheel drop out member, said hitch assembly comprising: a longitudinally extending generally rectangular main body for mating a generally planar back surface thereof to a first side of said drop out member and a front surface for coacting with a bicycle trailer tongue, said main body having a first and a second portion, said first portion being generally U-shaped as defined by a generally horizontal open slot extending from a left end of said first portion and through said main body; said second portion recessed from said front surface and having an aperture for receiving a bicycle skewer therethrough; a tongue bolt for insertion through said slot from said back surface and connected to said trailer tongue; first fastening means for securing said tongue bolt to said trailer tongue; and second fastening means for securing said skewer to said second portion.

6. The bicycle trailer hitch assembly of claim 5 wherein said second fastening means further securely tightens said trailer hitch assembly against said drop out member.

7. The bicycle trailer hitch assembly of claim 6 further including retainer means for retaining said tongue bolt within said slot and wherein a head of said tongue bolt is restrained by recessed means in said back surface.

8. The bicycle trailer hitch assembly of claim 7 further comprising a second main body similarly configured as said main body for mating to a side of said drop out member opposite to said first side for coacting with a second portion of said bicycle trailer tongue.

9. The bicycle trailer hitch assembly of claim 5 wherein said aperture includes anti-pivot means for preventing rotation of said main body.

* * * * *